United States Patent [19]

Bertolacini et al.

[11] 3,923,638

[45] Dec. 2, 1975

[54] TWO-CATALYST HYDROCRACKING PROCESS

[75] Inventors: Ralph J. Bertolacini, Chesterton; Louis C. Gutberlet, Crown Point, both of Ind.; Allen A. Kozinski, Urbana, Ill.

[73] Assignee: Standard Oil Company, Chicago, Ill.

[22] Filed: Dec. 20, 1973

[21] Appl. No.: 426,921

Related U.S. Application Data

[63] Continuation-in-part of Ser. No. 206,810, Dec. 10, 1971, which is a continuation-in-part of Ser. No. 814,997, April 10, 1969, abandoned.

[52] U.S. Cl. .................................................. 208/89
[51] Int. Cl.² ......................................... C10G 23/00
[58] Field of Search .................. 208/89, 111, 254 H

[56] References Cited
UNITED STATES PATENTS

| | | | |
|---|---|---|---|
| 3,393,148 | 7/1968 | Bertolacini et al. | 208/254 H |
| 3,420,768 | 1/1969 | Bray et al. | 208/89 |
| 3,468,788 | 9/1969 | Wilkinson | 208/89 |
| 3,535,227 | 10/1970 | Kittrell | 208/59 |
| 3,536,605 | 10/1970 | Kittrell | 208/59 |
| 3,546,094 | 12/1970 | Jaffe | 208/89 |
| 3,546,096 | 12/1970 | Kittrell | 208/60 |
| 3,558,471 | 1/1971 | Kittrell | 208/59 |
| 3,558,475 | 1/1971 | Jaffe | 208/254 H |
| 3,788,974 | 1/1974 | Buchmann et al. | 208/89 |

*Primary Examiner*—Delbert E. Gantz
*Assistant Examiner*—James W. Hellwege
*Attorney, Agent, or Firm*—James L. Wilson; Arthur G. Gilkes; William T. McClain

[57] ABSTRACT

The process comprises contacting a feedstock which boils above about 350°F. and which contains nitrogen in an amount within the range of about 1 ppm to about 3,000 ppm in a feed-preparation zone in the presence of hydrogen and under hydrodenitrogenation conditions with a hydrodenitrogenation catalyst to obtain a denitrogenated effluent, and contacting at least a portion of the denitrogenated effluent in a hydrocracking zone in the presence of hydrogen and under hydrocracking conditions with a hydrocracking catalyst to obtain a hydrocracked effluent. The hydrodenitrogenation catalyst comprises as a hydrogenation component a Group VIA metal and Group VIII metal and/or their compounds and a cocatalytic acidic support comprising a large-pore crystalline aluminosilicate material and a refractory inorganic oxide. The hydrocracking catalyst comprises as a hydrogenation component a Group VIA metal and a Group VIII metal and/or their compounds, and an acidic support of large-pore crystalline aluminosilicate material. For both hydrodenitrogenation catalyst and the hydrocracking catalyst, the preferred hydrogenation component comprises nickel and tungsten and/or their compounds and the preferred large-pore crystalline aluminosilicate material is ultrastable, large-pore crystalline aluminosilicate material. The preferred process is a single-stage process.

21 Claims, 1 Drawing Figure

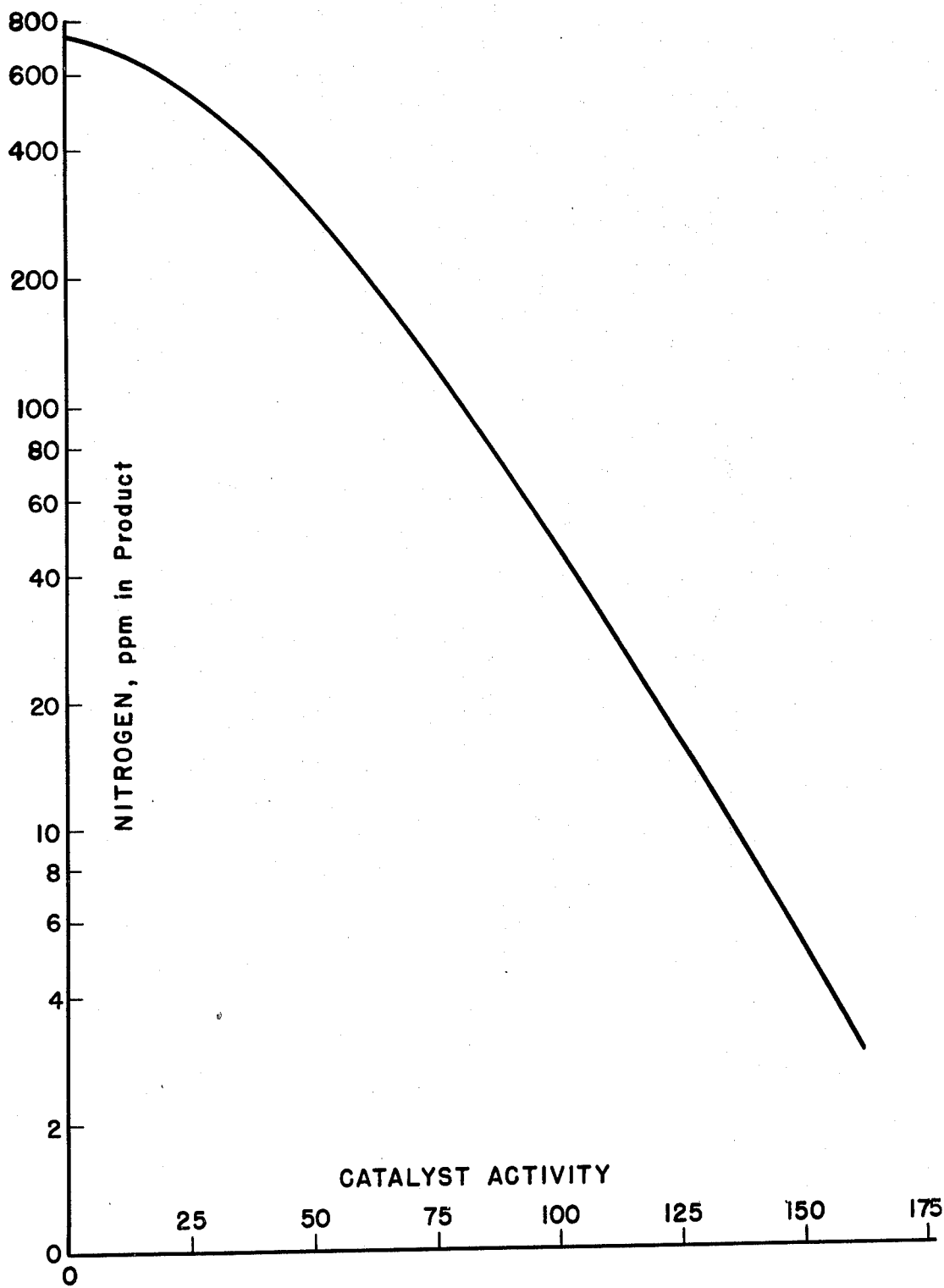

3,923,638

TWO-CATALYST HYDROCRACKING PROCESS

CROSS-REFERENCE TO RELATED APPLICATION

This is a continuation-in-part of co-pending application Ser. No. 206,810, filed on Dec. 10, 1971. Application Ser. No. 206,810 is, in turn, a continuation-in-part application of application Ser. No. 814,997, which was filed on Apr. 10, 1969, and is now abandoned.

BACKGROUND OF THE INVENTION

The present invention is directed to a hydrocarbon conversion process. More particularly, it is directed to a process for treating mineral oils, which results in a chemical alteration of at least some of the hydrocarbon molecules of the mineral oils to form lower-molecular-weight molecules and mineral oils having different properties. Still more particularly, the present invention is directed to a two-catalyst process for hydrocracking petroleum hydrocarbon feedstocks containing substantial amounts of nitrogen compounds.

There are a large number of processes for hydrocracking petroleum hydrocarbon feedstocks. Some can be used only to hydrocrack feedstocks which contain only low amounts of nitrogen compounds; while others adequately convert to lower-molecular-weight hydrocarbon compounds feedstocks which contain substantial amounts of nitrogen compounds. Many of the latter processes comprise two stages, a feed-preparation stage and a hydrocracking stage, the two stages operating with different catalysts. The first stage, in general, contains a hydrodenitrogenation and hydrodesulfurization catalyst, a catalyst comprising a hydrogenation component and an essentially non-cracking refractory inorganic oxide catalyst support. The second stage contains a hydrocracking catalyst, a catalyst comprising a hydrogenation component on an acidic cracking support. While many of the processes comprise two stages, some comprise only one stage, which may operate effectively with one catalyst or with two or more catalysts.

A new process for hydrocracking petroleum hydrocarbon feedstocks containing substantial amounts of nitrogen compounds has been developed. This new and novel process employs sequentially two different catalysts and may be operated as either a single-stage process or a twostage process. This process has unexpectedly been found to provide an increased amount of hydrogenation activity which makes it suitable for the production of saturated products adequate for use as jet fuel.

SUMMARY OF THE INVENTION

A new and novel process for hydrocracking petroleum hydrocarbon feedstocks containing substantial amounts of nitrogen has been developed. Broadly, this process comprises contacting a feedstock which boils above about 350°F. and which contains nitrogen in an amount within the range of about 1 ppm to about 3,000 ppm in a feed-preparation zone in the presence of hydrogen and under hydrodenitrogenation conditions with a hydrodenitrogenation catalyst to obtain a denitrogenated effluent, and contacting at least a portion of said denitrogenated effluent in a hydrocracking zone in the presence of hydrogen and under hydrocracking conditions with a hydrocracking catalyst to obtain a hydrocracked effluent.

The hydrodenitrogenation catalyst comprises as a hydrogenation component a member selected from the group consisting of (1) a metal from Group VIA of the Periodic Table of Elements and a metal from Group VIII of the Periodic Table of Elements, (2) their oxides, (3) their sulfides, and (4) mixtures thereof, and a co-catalytic acidic support comprising a large-pore crystalline aluminosilicate material and a refractory inorganic oxide. As referred to herein, the Periodic Table of Elements is that Periodic Table that is published on page 2 of MODERN ASPECTS OF INORGANIC CHEMISTRY, H. J. Emeleus and J. S. Anderson, D. Van Nostrand Company, Inc., New York, N.Y., 1949. The hydrocracking catalyst comprises as a hydrogenation component a member selected from the group consisting of (1) a metal from Group VIA of the Periodic Table of Elements and a metal from Group VIII of the Periodic Table of Elements, (2) their oxides, (3) their sulfides, and (4) mixtures thereof, and an acidic support of large-pore crystalline aluminosilicate material. For either catalyst, the preferred large-pore crystalline aluminosilicate material is ultrastable, large-pore crystalline aluminosilicate material. In addition, for either catalyst, the preferred Group VIA metals are tungsten and molybdenum, and the preferred Group VIII metals are nickel and cobalt. Preferably, the ultrastable, large-pore crystalline aluminosilicate material is suspended in the porous matrix of the refractory inorganic oxide of the hydrodenitrogenation catalyst. The preferred refractory inorganic oxide is silicaalumina.

Operating conditions to be used in the hydrodenitrogenation reaction zone are an average catalyst bed temperature within the range of about 400° to about 800°F., a liquid hourly space velocity (LHSV) within the range of about 0.1 to about 20 volumes of hydrocarbon per hour per volume of catalyst, a total pressure within the range of about 500 psig to about 5,000 psig, and a hydrogen-to-oil ratio within the range of about 5,000 standard cubic feet of hydrogen per barrel of hydrocarbon (SCFB) to about 40,000 SCFB.

Operating conditions to be used in the hydrocracking reaction zone are an average catalyst bed temperature within the range of about 650° to about 850°F., a LHSV within the range of about 0.1 to about 10 volumes of hydrocarbon per hour per volume of catalyst, a total pressure within the range of about 500 psig to about 5,000 psig, and a hydrogen-to-oil ratio within the range of about 5,000 SCFB to about 20,000 SCFB.

This process for hydrocracking petroleum hydrocarbon feedstocks containing substantial amounts of nitrogen provides a very active catalyst system, improved denitrogenation, and an increased amount of saturation. Advantageously, it produces hydrocarbon streams that are favorable for use in the manufacture of jet fuels.

BRIEF DESCRIPTION OF THE DRAWING

The accompanying FIGURE presents the relationship that was used in the calculation of the relative hydrodenitrogenation activity of catalysts considered hereinafter.

DESCRIPTION AND PREFERRED EMBODIMENTS

One of the important processes for the conversion of petroleum hydrocarbon fractions is hydrocracking. Hydrocracking is a general term which is applied to petroleum refining processes wherein hydrocarbon feedstocks which have relatively high molecular weights are converted to lower-molecular-weight hydrocarbons at elevated temperature and pressure in the presence of a hydrocracking catalyst and a hydrogen-containing gas. Hydrogen is consumed in the conversion of organic nitrogen and sulfur to ammonia and hydrogen sulfide, respectively, in the destruction of high-molecular-weight compounds into lower-molecular-weight compounds, and in the saturation of olefins and other unsaturated compounds. Typically, hydrocarbon feedstocks that boil within the range of about 350° to about 1,000°F. are converted in hydrocracking processes to lower-molecular-weight products, such as gasoline-boiling-range products and light distillates.

Typical hydrocarbon feedstocks contain nitrogen compounds in amounts such that the amount of nitrogen that is present is greater than 20 parts per million (ppm). The nitrogen tends to reduce the activity of the catalyst that is employed in the hydrocracking reaction zone. Such reduction in catalytic activity results in inefficient operation and poor product distribution and yields. Higher reaction temperatures are required with increasing nitrogen contents to maintain a specified converstion level. Generally, the nitrogen content of a hydrocarbon feedstock can be reduced by subjecting that feedstock to a feed-preparation treatment. In such instance, the nitrogen compounds and sulfur compounds are converted into ammonia and hydrogen sulfide, respectively.

Generally, hydrocracking processes that operate at low temperatures for maximizing products that boil in the gasoline boiling range employ two processing stages. In the first stage, namely, the feedpreparation stage, the feedstock is hydrotreated to remove nitrogen and sulfur that are typically found in the usual refinery feedstocks. In the second stage, the hydrocracking stage, the pre-treated hydrocarbon stream is converted into lower-boiling products. In the typical two-stage process, there is provided a separation step between the two stages, wherein ammonia and hydrogen sulfide that have been produced in the first stage are removed from the effluent from the first stage prior to the introduction of the effluent into the second stage.

Recently, one-stage hydrocracking processes have been developed. In a one-stage process, the ammonia and hydrogen sulfide that are formed during the denitrogenation and desulfurization are not separated from the hydrocarbons prior to their subsequent hydrocracking. In other words, the ammonia and hydrogen sulfide formed by the denitrogenation and desulfurization are permitted to pass into and through the zone where hydrocracking occurs.

In either a one-stage process or a two-stage process, two zones are present. In one zone, the denitrogenation and desulfurization take place, while in the second zone, hydrocracking is the principal reaction. The catalysts in the two zones may be different, or the same type of catalyst may be employed in both zones.

In any event, the use of a separation step between the first zone containing a first catalyst and the second zone containing a second catalyst, which separation step is used to remove the ammonia and hydrogen sulfide produced during the conversion in the first zone, characterizes a two-stage process. If there is no removal of this hydrogen sulfide and ammonia by means of an intermediate separation step, the process is a onestage process, even though two zones are present and each zone contains a catalyst that is different than the catalyst in the other zone.

The process of the present invention may comprise either a single-stage process or a two-stage process. The single-stage process is a preferred embodiment.

The hydrocarbon feedstock to be charged to the process of the present invention is a petroleum hydrocarbon feedstock that boils within the range of about 350° to about 1,000°F., or higher. Typically, a light catalytic cycle oil (LCCO), or a light virgin gas oil (LVGO), or mixture thereof, boiling within the range of about 350° to about 650°F., is employed as a feedstock. The feed may have a significant sulfur content, ranging from about 0.1 to as much as 3 weight percent, and a significant nitrogen content, which may be in excess of 500 ppm. The feedstock may contain as much as 3,000 ppm of nitrogen, or as little as 1 ppm, or less. The concentrations of nitrogen and sulfur are substantially reduced in the feed-preparation zone of the process of the present invention.

In the feed-preparation zone of the process of the present invention, the feedstock is contacted with a suitable catalyst as hereinafter described in the presence of a hydrogen-affording gas under hydrodenitrogenation conditions. An excess of hydrogen is maintained in this feed-preparation zone, which may comprise a portion of one reactor or several reactors of a multi-reactor system. Advantageously, a hydrogento-oil ratio of at least 5,000 SCFB is employed, but this ratio may range up to about 40,000 SCFB. Preferably, a hydrogen-to-oil ratio of about 10,000 SCFB to about 25,000 SCFB is employed. Usually the total pressure in this feed-preparation zone is within the range of about 500 psig to about 5,000 psig; preferably between about 1,000 psig to about 2,000 psig. The average catalyst bed temperature is within the range of about 400° to about 800°F.; preferably, it is within the range of about 650° to about 750°F. The LHSV in the feed-preparation zone is maintained within the range of about 0.1 to about 20 volumes of hydrocarbon per hour per volume of catalyst; preferably, the LHSV is within the range of about 0.5 to about 5 volumes of hydrocarbon per hour per volume of catalyst. The weight hourly space velocity (WHSV) is within the range of about 0.1 to about 20 weight units of hydrocarbon per hour per weight unit of catalyst; preferably, the WHSV is within the range of about 0.5 to about 5 weight units of catalyst.

The catalyst that is employed in the feed-preparation zone of the process of the present invention may be pre-treated for several hours under a pressure within the range of about 0 psig to about 2,000 psig in flowing hydrogen at a temperature within the range of about 350° to about 750°F. The hydrogen flow rate for this catalyst pre-treatment may be maintained within the range of about 20 standard cubic feet per hour per pound of catalyst (SCFHP) to about 200 SCFHP. Typically, the pressure and hydrogen flow rate are the same as those described above for use in the feed-preparation zone. Alternatively, a hydrogen stream containing a small amount of hydrogen sulfide, e.g., up to about 10 volume percent hydrogen sulfide, may also be used as the gaseous medium for pre-treating the catalyst in the feed-preparation zone.

In the hydrocracking zone of the process of the present invention, at least a portion of the effluent from the feed-preparation zone is contacted with the hereinafter-described hydrocracking catalyst under hydrocracking conditions in the presence of hydrogen. Hydrogen is consumed in the hydrocracking process and, consequently, an excess of hydrogen is maintained in the hydrocracking reaction zone. Advantageously, a hydrogen-to-oil ratio of at least 5,000 SCFB is used; this ratio may range up to about 20,000 SCFB. A preferred range for the hydrogen-to-oil ratio is about 8,000 SCFB to about 15,000 SCFB. A high hydrogen partial pressure is desirable from the standpoint of prolonging catalyst activity. The average catalyst bed temperature is within the range between about 650° and about 850°F.; preferably, this temperature is within the range of about 680° to about 800°F. The total pressure is within the range of about 500 psig to about 5,000 psig; preferably, the pressure is maintained within the range of about 1,000 psig to about 2,000 psig. The LHSV in the hydrocracking zone is maintained within the range of about 0.1 to about 10 volumes of hydrocarbon per hour per volume of catalyst; preferably, the LHSV is within the range of about 0.5 to about 5 volumes of hydrocarbon per hour per volume of catalyst. The WHSV in the hydrocracking zone is within the range of about 0.1 to about 10 weight units of hydrocarbon per hour per weight unit of catalyst; preferably, the WHSV is within the range of about 0.5 to about 5 weight units of hydrocarbon per hour per weight unit of catalyst.

The catalyst to be used in the feed-preparation zone is a superior hydrodenitrogenation catalyst and comprises a hydrogenation component and a co-catalytic acidic support, which support comprises a large-pore crystalline aluminosilicate material and a refractory inorganic oxide. While a number of large-pore crystalline aluminosilicate materials may be used in the catalytic composition that is employed in the feed-preparation zone, an ultrastable, large-pore crystalline aluminosilicate material is preferred. This ultrastable, large-pore crystalline aluminosilicate material provides a catalyst having a very good activity for the denitrogenation of the feedstock being employed and superior activity maintenance. Moreover, this ultrastable, large-pore crystalline aluminosilicate material possesses superior stability to elevated temperatures and wetting-drying cycles.

This hydrodenitrogenation catalyst comprises as a hydrogenation component a member selected from the group consisting of (1) a metal from Group VIA of the Periodic Table of Elements and a metal from Group VIII of the Periodic Table of Elements, (2) their oxides, (3) their sulfides, and (4) mixtures thereof. The preferred Group VIA metals are tungsten and molybdenum. The preferred Group VIII metals are nickel and cobalt. The combinations of the above metals, expressed as oxides and in order of preference, are $NiO-WO_3$, $NiO-MoO_3$, $CoO-MoO_3$, and $CoO-WO_3$.

When the hydrogenation component of the hydrodenitrogenation catalyst comprises nickel and tungsten and/or their compounds, the nickel and tungsten are present in a total amount within the range of about 0.03 to about 0.20 gram-mole of $NiO$ and $WO_3$ per 100 grams of catalyst and in a tungsten-to-nickel ratio within the range of about 0.6 to about 12.0. Advantageously, the nickel and tungsten are present in a total amount within the range of about 0.05 to about 0.18 gram-mole of $NiO$ and $WO_3$ per 100 grams of catalyst and in a tungsten-to-nickel ratio within the range of about 1.2 to about 8.0. Preferably, the nickel and tungsten are present in a total amount within the range of about 0.07 to about 0.13 gram-mole of $NiO$ and $WO_3$ per 100 grams of catalyst and in a tungsten-to-nickel ratio within the range of about 2 to about 5.

The hydrogenation component may be deposited upon the cocatalytic acidic support or it may be incorporated into the acidic support by impregnation employing heat-decomposable salts of the desired hydrogenation metals. Each of the metals may be impregnated into the support separately, or they may be co-impregnated into the support. Alternatively, the hydrogenation-component metals may be co-precipitated with a hydrogel of the refractory inorganic oxide. In this latter method, the finely divided large-pore crystalline aluminosilicate material is thoroughly blended into the hydrogel and then each metal of the hydrogenation component is added separately to the blend in the form of a heat-decomposable salt of that metal. The composite is subsequently dried and calcined to decompose the salts and to remove the undesired anions.

The co-catalytic acidic support of the catalytic composition that is used in the feed-preparation zone comprises, as stated above, a large-pore crystalline aluminosilicate material and a refractory inorganic oxide. The acidic support material contains from about 5 weight percent to about 70 weight percent large-pore crystalline aluminosilicate material. Preferably, the acidic support contains from about 30 weight percent to about 50 weight percent aluminosilicate material. Preferably, the large-pore crystalline aluminosilicate material is distributed throughout and suspended in a porous matrix of the refractory inorganic oxide. A preferred refractory inorganic oxide is silica-alumina. Both low-alumina and high-alumina silica-alumina cracking catalysts may be employed in the support of the catalytic composition of this invention. Generally, low-alumina silica-alumina cracking catalysts contain from about 10 weight percent to about 15 weight percent alumina. High-alumina silica-alumina cracking catalysts contain from about 20 weight percent to about 40 weight percent alumina. A low-alumina silica-alumina cracking catalyst is preferred.

The co-catalytic acidic support may be prepared by various well-known methods and formed into pellets, beads, and extrudates of the desired size. For example, the large-pore crystalline aluminosilicate material may be pulverized into finely divided material, and this latter material may then be intimately admixed with the refractory inorganic oxide. The finely divided crystalline aluminosilicate material may be admixed thoroughly with a hydrosol or hydrogel or the refractory inorganic oxide. Where a thoroughly blended hydrogel is obtained, this hydrogel may be dried and broken into pieces of desired shapes and sizes. The hydrogel may also be formed into small spherical particles by conventional spray drying techniques or equivalent means.

The characteristics of large-pore crystalline aluminosilicate materials, such as X-type and Y-type aluminosilicate materials, and methods for preparing them have been presented in the chemical art. Their structures comprise networks of relatively small aluminosilicate cavities which are interconnected by numerous pores. These pores are smaller than the cavities and have an essentially uniform diameter at their narrowest cross section. Basically, the networks of cavities are fixed three-dimensional and ionic networks of silica and alumina tetrahedra. These tetrahedra are cross-linked by the sharing of oxygen atoms. Cations are included in the crystal structure of the aluminosilicate material to balance the electrovalence of the tetrahedra. Examples of such cations are metal ions, hydrogen ions, and hydrogen-ion precursors, such as ammonium ions. By means of the technique known as cation exchange, one cation may be exchanged for another. This technique is well-known to those skilled in the art.

The crystalline aluminosilicate materials that are employed in the hydrodenitrogenation catalysts are large-pore materials. By large-pore materials is meant materials that have pores which are sufficiently large to permit the passage thereinto of benzene molecules and larger molecules and the passage therefrom of reaction products. For use in petroleum hydrocarbon conversion processes, it is preferred to employ a large-pore aluminosilicate material having a pore size of at least 9 to 10 Angstrom units. The large-pore crystalline aluminosilicate materials that are employed in the hydrodenitrogenation catalyst of this invention possess such a pore size.

A preferred large-pore crystalline aluminosilicate material is ultrastable, large-pore crystalline aluminosilicate material. An example of ultrastable, large-pore crystalline aluminosilicate material is Z-14US zeolite. Several types of Z-14US zeolite are considered in the U.S. Pat. Nos. 3,293,192 and 3,449,070.

The ultrastable, large-pore crystalline aluminosilicate material is stable to exposure to elevated temperatures. This stability to elevated temperatures is discussed in U.S. Pat. No. 3,293,192 and in U.S. Pat. No. 3,449,070 and may be demonstrated by a surface area measurement after calcination at 1,725°F. For example, after calcination at a temperature of 1,725°F. for a period of two hours, there is retained a surface area of greater than 150 square meters per gram ($M^2$/gm.). Moreover, its stability has been demonstrated by a surface area measurement after a steam treatment with an atmosphere of 25 percent steam at a temperature of 1,525°F. for 16 hours. As shown in U.S. Pat. No. 3,293,192, examples of the ultrastable aluminosilicate material Z-14US zeolite have a surface area after this steam treatment that is greater than 200 $M^2$/gm.

The ultrastable, large-pore crystalline aluminosilicate material exhibits extremely good stability toward wetting, which is defined as that ability of a particular aluminosilicate material to retain surface area or nitrogen-adsorption capacity after contact with water or water vapor. A sodium-form of the ultrastable, large-pore crystalline aluminosilicate material (about 2.15 weight percent sodium) was shown to have a loss in nitrogen-adsorption capacity that is less than 2 percent per wetting, when tested for stability to wetting by subjecting the material to a number of consecutive cycles, each cycle consisting of a wetting and a drying.

The ultrastable, large-pore crystalline aluminosilicate material that is preferred for the catalytic composition of this invention exhibits a cubic unit cell dimension and hydroxyl infrared bands that distinguish it from other aluminosilicate materials.

The cubic unit cell dimension of the ultrastable, large-pore crystalline aluminosilicate material is within the range of about 24.20 Angstrom units to about 24.55 Angstrom units.

The hydroxyl infrared bands obtained with this preferred ultrastable large-pore crystalline aluminosilicate material are a band near 3750 $cm^{-1}$, a band near 3700 $cm^{-1}$, and a band near 3625 $cm^{-1}$. The band near 3750 $cm^{-1}$ may be found on many of the hydrogen-form and decationized aluminosilicate materials, but the band near 3700 $cm^{-1}$ and the band near 3625 $cm^{-1}$ are characteristic of the preferred ultrastable, large-pore crystalline aluminosilicate material that is employed in the catalytic composition of the present invention.

The ultrastable, large-pore crystalline aluminosilicate material is also characterized by an alkali metal content of less than 1 percent.

Ultrastable, large-pore crystalline aluminosilicate material can be prepared from certain faujasites by subjecting the latter to special treatment under specific conditions. Typical preparations of ultrastable, large-pore crystalline aluminosilicate material are considered in U.S. Pat. no. 3,293,192 and in U.S. Pat. No. 3,449,070. The preferred ultrastable, large-pore crystalline, aluminosilicate material may be prepared by a method of preparation which usually involves a first step wherein most of the alkali metal cation is cation-exchanged with an ammonium salt solution to leave approximately enough alkali metal cations to fill the bridge positions in the faujasite structure. After this cation-exchange treatment, the aluminosilicate material is subjected to a heat treatment at a temperature within the range of about 700°C. (1,292°F.) to about 800°C. (1,472°F.). The heat-treated aluminosilicate material is then subjected to further cation-exchange treatment to remove additional residual alkali metal cations. The preferred material may be prepared by methods of preparation disclosed in U.S. Pat. No. 3,449,070 and by Procedure B presented in the paper "A New Ultra-Stable Form of Faujasties" by C. V. McDaniel and P. K. Maher, presented at a Conference on Molecular Sieves held in London, England, in April, 1967. The paper was published in 1968 by the Society of Chemical Industry.

The hydrocracking catalyst to be used in the hydrocracking reaction zone of the process of the present invention comprises as a hydrogenation component a member selected from the group consisting of (1) a metal from Group VIA of the Periodic Table of Elements and a metal from Group VIII of the Periodic Table of Elements, (2) their oxides, (3) their sulfides, and (4) mixtures thereof and an acidic support of large-pore crystalline aluminosilicate material. Again, the preferred Group VIA metals are tungsten and molybdenum; the preferred Group VIII metals are nickel and cobalt. The combinations of metals for the hydrogenation component, expressed as oxides and in the order of preference, are $NiO-WO_3$, $NiO-MoO_3$, $CoO-MoO_3$, and $CoO-WO_3$.

The hydrogenation component may be deposited upon, incorporated into, or impregnated into the acidic support of the hydrocracking catalyst through the use of some of the techniques described hereinabove for the hydrodenitrogenation catalyst.

When the hydrogenation component of the hydrocracking catalyst comprises nickel and tungsten and/or their compounds, the nickel and tungsten are present in a total amount within the range of about 0.03 to about 0.20 gram-mole of NiO and $WO_3$ per 100 grams of catalyst and in a tungsten-to-nickel ratio within the range of about 0.6 to about 12.0. Advantageously, the nickel and tungsten are present in a total amount within the range of about 0.05 to about 0.18 gram-mole of NiO and $WO_3$ per 100 grams of catalyst and in tungsten-to-nickel ratio within the range of about 1.2 to about 8.0. Preferably, the nickel and tungsten are present in a total amount within the range of about 0.07 to about 0.13 gram-mole of NiO and $WO_3$ per 100 grams of catalyst and in a tungsten-to-nickel ratio within the range of about 2 to about 5. The optimum tungsten-to-nickel ratio is 3.

As was the case for the hydrodenitrogenation catalyst, the preferred large-pore crystalline aluminosilicate material of the hydrocracking catalyst of the process of the present invention is ultrastable, large-pore crystalline aluminosilicate material, which is described hereinabove.

The hydrocracking process of this invention comprises two reaction zones, a feed-preparation zone and a hydrocracking zone. The two zones may be in a single-stage process, or alternatively, each zone may comprise a stage of a two-stage process. As was stated hereinabove, a single-stage process is a preferred embodiment of the hydrocracking process of the present invention.

The following examples are presented to facilitate a better understanding of the present invention. It is to be understood that these examples are for the purpose of illustration only and are not intended to limit the scope of the present invention.

EXAMPLE I

In this example, a catalyst was prepared for use in the feed-preparation zone of an embodiment of the process of the present invention. This catalyst comprised the oxides of nickel and tungsten on an acidic support which comprised ultrastable, large-pore crystalline aluminosilicate material suspended in a porous matrix of silica-alumina.

A commercially prepared catalyst support material was impregnated with nickel and tungsten salts. The catalyst support material comprised 35 weight percent ultrastable, large-pore crystalline aluminosilicate material suspended in a matrix of low-alumina silica-alumina. The ultrastable aluminosilicate material, existing as finely divided particles, had been thoroughly blended with a gel of the silica-alumina, spray dried, and calcined in air. A 97-gram portion of this support material was contacted with a solution which had been prepared by dissolving 10.9 grams of ammonium meta-tungstate and 9.7 grams of nickelous nitrate in 110 ml. of hot distilled water (about 160°F.). The catalyst support material was soaked with the aqueous solution of the nickel and tungsten salts; however, only sufficient solution to fill the pore volume of the catalyst support material was employed. The impregnated catalyst mass was then dried for one hour at a temperature of about 250°F. in air flowing at a rate of about 1.5 cubic feet per hour, pelleted into one-fourth × one-fourth inch pellets with Sterotex (about 4 weight percent), and calcined for 3 hours at a temperature of about 1,000°F. in air flowing at a rate of about 1.5 cubic feed per hour. This catalyst, identified hereinafter as Catalyst A, was prepared to contain 2.5 weight percent NiO and 10 weight percent $WO_3$.

This Catalyst A was tested in typical bench-scale equipment to ascertain its ability to hydrodenitrogenate a heavy catalyst cycle oil (HCCO). The bench-scale test equipment employed a tubular stainless steel reactor and conventional product-recovery and analytical equipment. The reactor was 20 inches long and had an inside diameter of 0.622 inch. A catalyst charge of 15 grams of granular material which would pass through a 20-mesh U.S. Sieve, but not a 40-mesh U.S. Sieve, was employed. This catalyst was supported in the lower one-third of the reactor on a layer of 4-millimeter Pyrex glass beads. The volume of the reactor above the catalyst bed was empty. The catalyst bed occupied about 6.5 inches of reactor length. The reactor temperature was maintained by use of a hot molten salt bath of DuPont HITEC. The catalyst bed temperatures were measured by means of a co-axial thermocouple.

Prior to its hydrodenitrogenation test, Catalyst A was pretreated at 1250 psig and 500°F. for 2 hours with hydrogen flowing at the rate of 100 SCFHP. After the pre-treat, hydrocarbon feed was introduced into the unit at a WHSV of 1.9 grams of hydrocarbon per hour per gram of catalyst. This feedstock, a HCCO, possessed the properties shown in Table I for Feedstock No. 1. Once-through hydrogen was added to the test system at a rate of about 18,000 SCFB. The average catalyst bed temperature was maintained at about 700°F. The length of the test run was 7 days.

TABLE I

| Feedstock No. | FEED PROPERTIES | | | |
|---|---|---|---|---|
| | 1 | 2 | 3 | 4 |
| Type | HCCO | LVGO/LCCO | LVGO | LVGO |
| ASTM Distillation, °F. | | | | |
| IBP | 413 | 398 | 422 | 425 |
| 10 vol. % ovhd | 594 | 475 | 466 | 495 |
| 30 | 644 | 519 | 489 | 527 |
| 50 | 672 | 546 | 508 | 549 |
| 70 | 704 | 563 | 535 | 576 |
| 90 | 750 | 614 | 587 | 626 |
| Maximum | — | 632 | 643 | 667 |
| Gravity, °API | 17.1 | 27.5 | 34.5 | 34.4 |
| Refractive Index, $n_D^{20}$ | 1.5507 | 1.5026 | — | 1.4734 |
| Sulfur, wt.% | 0.77 | 0.25 | 0.077 | 0.16 |
| Nitrogen, ppm | 736 | 159 | 31 | 67 |
| Molecular weight | 249 | 205 | 220 | 232 |
| Hydrocarbon Type, vol.% | | | | |
| Paraffins | 16.9 | 23.5 | 26.6 | 32.5 |
| Naphthenes | 34.3 | 34.3 | 55.2 | 44.4 |
| Aromatics | 48.8 | 42.2 | 18.2 | 23.1 |

The performance of Catalyst A was compared to that of a reference catalyst, hereinafter designated as Catalyst B. Catalyst B, which had been subjected to a pretreatment similar to that of Catalyst A, was used in the preparation of a hydrodenitrogenation activity scale. This activity scale or relationship is represented in the accompanying figure. This figure represents the relationship between the nitrogen content of the product of the test and catalyst activity. The data for this correlation were obtained with Catalyst B, a commercially prepared sulfided-nickel-tungsten-on-fluorided-silica-alumina catalyst. This catalyst, obtained from the Harshaw Chemical Company (Harshaw Catalyst Ni-4401E), contained 5.6 weight percent nickel, 14.0 weight percent tungsten, 6.1 weight percent sulfur, 1.4 weight percent fluorine, and 14.6 weight percent alumina. It had a surface area of 176 square meters per gram and was obtained as a 1/10-inch extrudate. The tests were conducted at an average catalyst bed temperature of about 700°F., a variable WHSV, a hydrogen addition rate of about 18,000 SCFB, and a total pressure of 1,250 psig. A value of 100 was assigned as the relative activity of Catalyst B for the test made at a WHSV of 1.9 grams of feed per hour per gram of catalyst. The results obtained on the sixth and seventh days of the hydrodenitrogenation test were arithmetically averaged; i.e., the nitrogen contents were averaged and the average catalyst bed temperatures were averaged.

For any test datum point, the nitrogen contents of a product sample obtained during the sixth day on the test and a product sample obtained during the seventh day on test were determined. Each sample, a 2-hour sample of total product, was first purged with flowing hydrogen at atmospheric pressure for about 5 minutes to remove hydrogen sulfide and ammonia. Then it was subjected to a Coulometric Titration for nitrogen. Alternatively, each sample could have been analyzed for total nitrogen by means of the Kjeldahl Method. The arithmetic average of the nitrogen values for the two samples was considered as the nitrogen content of the product obtained with the particular catalyst being tested.

The hydrodenitrogenation activity was determined for Catalyst A by obtaining from the accompanying figure the value for activity corresponding to the particular nitrogen content of the product determined from the product samples of the sixth and seventh days on test. This value is equivalent to 100 times the ratio of the activity of the catalyst tested at the average catalyst bed temperature of that test to the activity of the reference catalyst at an average catalyst bed temperature of 700°F. This relative activity value was corrected to an average catalyst bed temperature of 700°F. by means of the following equation:

$$A = A_o e^{-\frac{\Delta E}{R}\left[\frac{1}{T_o} - \frac{1}{T}\right]},$$

where
$A$ = activity of tested catalyst at the temperature of the test,
$A_o$ = activity of the tested catalyst at 700°F.,
$T$ = temperature of the test in °K.,
$T_o$ = 644°K. (700°F.),
$\Delta E$ = 11,000 calories per gram-mole, and
$R$ = 1.987 calories per gram-mole per °K.

Using the above method for calculation of the relative activity, an activity value of 138 was found for Catalyst A. This value of 138 was considerably greater than the assigned relative activity of 100 for the reference catalyst. Hence, Catalyst A, an embodiment of the catalyst employed in the hydrodenitrogenation zone of the process of the present invention, is a superior hydrodenitrogenation catalyst.

EXAMPLE II

In this example, an embodiment of the catalyst to be used in the hydrocracking zone of the process of the present invention was prepared.

For this catalyst, ultrastable, large-pore crystalline aluminosilicate material in a finely divided state was cation-exchanged to reduce its sodium content of 2.20 weight percent. The ultrastable, large-pore crystalline aluminosilicate material was cation-exchanged with ammonium sulfate solution for 4 hours at 90°C. (194°F.). The ammonium sulfate solution had been prepared by dissolving 157 grams of ammonium sulfate in 1.5 liters of distilled water. Contacting the aluminosilicate material with the solution was carried out with stirring. The cation-exchanged aluminosilicate material was filtered and water washed with approximately 1.5 gallons of hot distilled water (about 160°F.) in 500-ml. increments. The cation-exchange procedure was repeated twice. After the last exchange, the aluminosilicate material was washed free of the sulfate anions, dried in air at a temperature of about 250°F. for about 2 hours at an air flow rate of about 1.5 cubic feet per hour, and calcined for 2 hours at a temperature of 1,490°F. in air flowing at a rate of about 1.5 cubic feet per hour. The resultant ultrastable, large-pore crystalline aluminosilicate material contained 0.19 weight percent sodium.

An 85-gram portion of the latter material was impregnated with a solution that had been prepared by dissolving 19.4 grams of nickelous nitrate and 10.9 grams of ammonium metatungstate in 125 ml. of hot distilled water (about 160°F.). The impregnation including drying and calcining, was carried out pursuant to the techniques described above in Example I. This catalyst, hereinafter designated as Catalyst C, was prepared to contain 5 weight percent NiO and 10 weight percent $WO_3$.

Catalyst C was tested for its hydrocracking ability. The hydrocracking test was performed in a test unit similar to the one described above in Example I. A catalyst charge of 18 grams of granular material that would pass through a 12-mesh U.S. Sieve, but not a 20-mesh U.S. Sieve, was employed. The catalyst was supported in the lower one-third of the reactor on a layer of 4-millimeter Pyrex glass beads. The volume of reactor above the catalyst bed was empty. The catalyst bed occupied about 6.0 inches of reactor length.

Prior to its hydrocracking test, the catalyst was pretreated at 1,250 psig and 500°F. for 16 hours with hydrogen flowing at the rate of about 50 SCFHP. Hydrocarbon feed was introduced at 500°F. and the temperature was increased over a period of several hours until the desired conversion level was reached. Thereafter, temperature was adjusted to maintain approximately 77 weight percent conversion. Other processing conditions included a total pressure of 1,250 psig, a WHSV of about 1.46 grams of hydrocarbon per hour per gram of catalyst, and a hydrogen addition rate of about 12,000 SCFB. The hydrocarbon feedstock employed was a low-sulfur blend of LVGO and LCCO and is identified hereinafter as Feedstock No. 2. Its properties are presented above in Table I.

For each test, data were obtained from 1 to 13 days on stream. Weight balances were obtained on 2-hour samples taken at intervals of at least 24 hours. Product recoveries were generally above 99.0 weight percent, based on the hydrocarbon feed. Gas and liquid analyses were combined and normalized to 100 percent to obtain the conversion level. Product distributions were calculated to a total of 103 weight percent, based on hydrocarbon feed, to account for hydrogen consumption.

As used herein, conversion is defined as the percent of the total reactor effluent, both gas and liquid, that boils below a true boiling point of 380°F. This percent was determined by gas chromatography. The hydrocarbon product was sampled for analysis at intervals of not less than 24 hours. The sampling period was 2 hours, during which time the liquid product was collected under a dry-ice-acetone condenser to insure condensation of pentanes and heavier hydrocarbons. During this time, the hydrogen-rich off-gas was sampled and immediately analyzed for light hydrocarbons by isothermal gas chromatography. The liquid product was weighed and analyzed using a dual-column temperature-programmed gas chromatograph equipped with 6 feet × ¼ inch columns of SF-96 on fire brick and thermal-conductivity detectors. Individual compounds were measured through methylcyclopentane. The valley in the chromatograph just ahead of the n-undecane peak was taken as the 380°F. point. The split between light and heavy naphtha (180°F.) was arbitrarily selected as a specific valley within the $C_7$-paraffin-naphthalene group to conform with the split obtained by Oldershaw distillation of the product.

Temperature requirements for 77 percent conversion were calculated from the observed data by means of zero order kinetics and an activation energy of 35 kilocalories. Adjustment in temperature requirement was made also to a constant hydrogen-to-oil ratio of 12,000 SCFB using the equation:

$$\Delta T \,°F. = (1.3)(R-12)$$

where R is the gas rate in 1,000 SCFB.

The temperature required for 77 percent conversion was selected as the means for expressing the hydrocracking activity of the catalyst being tested. To eliminate irregular values that might be present at the start of the run, an estimated value for the temperature required for 77 percent conversion at 7 days on stream was obtained for the catalyst. To estimate these values, a plot showing the temperatures required for 77 percent conversion as ordinates and days on stream as abscissae was prepared and the value of the temperature at 7 days on stream was read from the smooth curve of this plot. This latter value was used to determine the activity of the catalyst that was employed in the test from which the plotted data were obtained.

The relative hydrocracking activity was obtained by using the following equation:

$$A = 100 e^{-\frac{\Delta E}{R}\left[\frac{1}{T_o} - \frac{1}{T}\right]},$$

, where $A$ = the relative activity of the tested catalyst,
$\Delta E$ = 35,000 calories per gram-mole.
$R$ = 1.987 calories per gram-mole per °K.,
$T$ = the temperature of the test for the seventh day in °K., and
$T_o$ = 646°K.

The heavy naphtha yield, i.e., the yield of product boiling between 180° and 380°F., was corrected for temperature and conversion. The following equation was used to calculate the heavy naphtha yield at common conditions of 725°F. and 77 weight percent conversion.

$$H_o = H + 15 \times 10^4 \left(\frac{1.8}{1185} - \frac{1.8}{T+460}\right) + 9 \times 10^8 \left(\frac{1.8}{1185} - \frac{1.8}{T+460}\right)^2$$

$$+ 19 \log \left(\frac{23}{100-C}\right).$$

where $H_o$ = heavy naphtha yield at 725°F. and 77 weight percent conversion,
$H$ = observed heavy naphtha yield, in weight percent,
$T$ = observed temperature in °F., and
$C$ = observed conversion in weight percent.

The heavy naphtha yield was used to express catalyst selectivity.

Catalyst C and a commercially prepared catalyst were each evaluated for their hydrocracking activity and selectivity pursuant to the above technique. The commercially prepared catalyst, designated hereinafter as Catalyst D, possessed a catalyst support comprising 35 weight percent ultrastable, large-pore crystalline aluminosilicate material suspended in a porous matrix of a low-alumina (about 13 weight percent alumina) silica-alumina material. Cobalt and molybdenum were impregnated into this catalyst support by means of a solution of cobalt acetate and a solution of ammonium molybdate, respectively.

A charge of 19.0 grams of Catalyst D was tested in a unit similar to that employed for Catalyst C. The catalyst bed occupied about 6.9 inches of reactor length. A WHSV of 1.38 grams of hydrocarbon per hour per gram of catalyst was employed. Other operating conditions were similar to those used in the test of Catalyst C. A relative activity of 100 was assigned to Catalyst D. Catalyst D, which was found to contain 2.52 weight percent CoO and 9.46 weight percent $MoO_3$, was assigned a relative activity value of 100. Table II shows the catalyst activity and selectively for Catalyst C and for Catalyst D.

TABLE II

| Catalyst | Catalyst Performance Activity | Selectivity |
|---|---|---|
| C | 220 | 59.2 |
| D | 100 | 59.5 |

The results of this hydrocracking test clearly demonstrate that the catalyst which is an embodiment of the catalyst that would be used in the hydrocracking zone of the process of the present invention, i.e., Catalyst C, has a much greater activity for hydrocracking Feedstock No. 2 than the commercially prepared catalyst, Catalyst D.

The results of Examples I and II clearly show that embodiments of the catalysts that would be employed in the process of the present invention are superior catalysts for the reactions for which they are to be used in the process of the present invention. To further demonstrated this and to demonstrate a preferred embodiment of the process of the present invention, the pilot plant study which is described hereinafter in Example III was carried out.

EXAMPLE III

In this example, three separate and distinct catalyst systems were studied in a multi-reactor pilot plant unit. One of these catalyst systems was a preferred embodiment of that used in the process of the present invention.

The multi-reactor pilot plant unit contained five identical reactors, each of which was made of 1-inch schedule 160 stainless steel pipe. Each had a preheat zone followed by an adibatic zone. The catalyst bed in each reactor was entirely within the adibatic zone of that reactor, contained 200 cc of catalyst, and required a length of about 24 inches in the reactor. consequently, the total catalyst loading in this pilot plant unit consisted of 1,000 cc of catalyst and resulted in a catalyst bed having a length of about 10 feet. Each of the five identical reactors contained the following loading of catalyst and alumina balls. Starting at the bottom of each reactor were 50 cc of one-fourth inch deactivated alumina balls, which served as a catalyst support. Above these alumina balls were 200 cc of catalyst. Above the catalyst were 200 cc of one-eighth inch deactivated alumina balls, which served as a preheating section. Conventional recovery equipment was employed to collect the products resulting from the process.

In the case of data obtained from this multi-reactor pilot plant unit, the average catalyst temperatures are the temperatures of the catlyst in the five reactors calculated by the method taught in the article "Equivalent Isothermal Temperatures for Nonisothermal Reactors" by John B. Malloy and Herman S. Seelig, which article appeared in A.I.Ch.E. JOURNAL, Vol. 1, No. 4, pp. 528–530 (December, 1955).

The first catalyst system to be considered was a preferred embodiment of the catalyst system that is employed in a preferred embodiment of the process of the present invention. This catalyst system comprised a hydrodenitrogenation catalyst, Catalyst E, and a hydrocracking catalyst, Catalyst F.

In preparing Catalyst E, a quantity of 904 grams of catalyst support material was impregnated with a solution of heat-decomposable salts of nickel and tungsten. The catalyst support comprised 35 weight percent ultrastable, large-pore crystalline aluminosilicate material suspended in a porous matrix of low-alumina silica-alumina. This support had been prepared commercially and the aluminosilicate material in a finely divided state had been blended with a sol or gel of the silicaalumina material, dried and calcined. The impregnation solution was prepared by dissolving 97 grams of nickelous nitrate and 109 grams of ammonium metatungstate in 1,500 ml. of hot distilled water (about 160°F.). The resultant mass was dried for three hours at 250°F. in air flowing at a rate of about 1.5 cubic feet per hour, pelleted with Sterotex (about 4 weight percent) to form one-eight × one-eight inch pellets, and calcined for 3 hours at 1,000°F. in air flowing at a rate of about 1.5 cubic feet per hour. Catalyst E was prepared to contain 2.5 weight percent NiO and 10 weight percent $WO_3$.

Catalyst F was prepared by cation-exchanging ultrastable, large-pore crystalline aluminosilicate material with an ammonium sulfate solution to reduce the sodium content of the aluminosilicate material to about 0.35 weight percent sodium and then impregnating the exchanged material with the hydrogenation component. The cation-exchange technique was similar to that employed in Example II. The impregnation solution was prepared by dissolving 48.5 grams of nickelous nitrate and 54.4 grams of ammonium metatungstate in 700 ml. of hot distilled water (about 160°F.). This solution was used to impregnate 438 grams of the low-sodium ultrastable, large-pore crystalline aluminosilicate material. The impregnated catalyst mass was dried for 3 hours at a temperature of about 250°F. in air flowing at a rate of about 1.5 cubic feet per hour, pelleted with Sterotex (about 4 weight percent) to form three-sixteenths × one-eighth inch pellets, and calcined for 3 hours at a temperature of about 1,000°F. in air flowing at a rate of about 1.5 cubic feet per hour. Catalyst F was prepared to contain 2.5 weight percent NiO and 10 weight percent $WO_3$.

Catalysts E and F were loaded into the reactors of the multireactor pilot plant unit. Catalyst E, the hydrodenitrogenation catalyst, was loaded into the first three reactors of the unit, while Catalyst F, the hydrocracking catalyst, was loaded into the last two reactors of the unit. Therefore, the dominant reaction occurring in the first three reactors comprised hydrodenitrogenation, i.e., feed-preparation; the dominant reaction occurring in the last two reactors comprised hydrocracking. A quantity of 132 grams of Catalyst E was charged to each of the first three reactors, while a quantity of 140 grams of Catalyst F was charged to each of the last two reactors.

After the catalysts had been loaded into their respective reactors, the reactor system was purged with nitrogen. The system was then pressured with hydrogen to 1,300 psig. Hydrogen was circulated through the system and was recycled at a rate of about 48 SCFH to pretreat the catalysts. The average catalyst temperature was increased to about 530°F. This catalyst pretreatment was conducted for 18 hours. Then a LVGO, hereinafter designated as Feedstock No. 3, was introduced into the system at an overall LHSV of about 0.4 cc of hydrocarbon per hour per cc of catalyst and an average catalyst bed temperature of about 520°F. The properties of Feedstock No. 3 are presented in Table I. The hydrogen recycle rate was maintained at about 9,000 SCFB. Over a period of about 6–8 hours, the overall LHSV was increased to 1.0 cc of hydrocarbon per hour per cc of catalyst. After about 24 hours on oil, unconverted oil was recycled, bringing the throughput ratio (TPR) of hydrocarbon to 1.3. The hydrogen recycle rate was adjusted to maintain a ratio of about 9,000 SCFB. The average catalyst temperatures were raised to produce 100 percent conversion of the fresh hydrocarbon feed to 360°F.-end-point gasoline and lighter materials.

After the unit had been on oil for 3 days, Feedstock No. 3 to the unit was stopped, and Feedstock No. 2 was introduced into the unit to provide an overall LHSV of 1.0. The TPR of 1.3 and the hydrogen recycle rate of about 9,000 SCFB were maintained. Yield data obtained from this run, Run No. 1, at 10 days on oil are presented in Table III.

TABLE III
DATA OBTAINED WITH FEEDSTOCK NO. 2

| Run No. | 1 | 2 | 3 |
|---|---|---|---|
| Catalyst System | Catalyst E & Catalyst F | Catalyst G & Catalyst D | Catalyst D |
| Hydrogen consumption, SCFB | 2,100 | 1,900 | 1,700 |
| LHSV | 1.0 | 1.0 | 1.0 |
| Reactor Pressure, psig | 1,300 | 1,300 | 1,300 |
| Hydrogen Recycle, SCFB | 9,000 | 9,000 | 9,000 |
| Average Catalyst Bed Temp. (100% conv.), °F. | 684 | 705 | 694 |
| Days on oil | 10 | 12 | 11 |
| Yields, wt.% of feed | | | |
| $H_2$ | −3.8 | −3.4 | −3.1 |
| $H_2S+NH_3$ | 0.3 | 0.3 | 0.3 |
| $C_1$ | 0.0 | 0.0 | 0.0 |
| $C_2$ | 0.3 | 0.4 | 0.4 |
| $C_3$ | 2.7 | 3.4 | 3.2 |
| i-$C_4$ | 6.9 | 7.6 | 6.8 |
| n-$C_4$ | 3.7 | 4.3 | 4.2 |
| i-$C_5$ | 8.9 | 10.4 | 10.4 |
| n-$C_5$ | 2.0 | 1.4 | 1.4 |
| Light Naphtha ($C_6$–180°F.) | 13.7 | 15.2 | 13.3 |
| Heavy Naphtha (180°F.–360°F.) | 65.3 | 60.6 | 63.1 |
| Heavy Naphtha Hydrocarbon Type, | | | |
| Paraffins | 34.9 | 34.5 | 34.9 |
| Naphthenes | 43.2 | 38.5 | 35.8 |
| Aromatics | 21.9 | 27.0 | 29.3 |

After 17.1 days on oil, Feedstock No. 2 was stopped and a HCCO, Feedstock No. 1, was introduced into the system. Fresh and recycle hydrocarbon flow and hydrogen recycle flow were adjusted to provide an LHSV of about 0.5, a TPR of about 1.3, and a hydrogen recycle rate of about 18,000 SCFB. Yield data obtained from Run No. 1 at 24 days on oil are presented in Table IV.

TABLE IV
DATA OBTAINED WITH FEEDSTOCK NO. 1

| Run No. | 1 | 2 |
|---|---|---|
| Catalyst System | Catalyst E & Catalyst F | Catalyst G & Catalyst D |
| Hydrogen consumption, SCFB | 3,901 | 3,320 |
| LHSV | 0.5 | 0.5 |
| Reactor pressure, psig | 1,300 | 1,300 |
| Hydrogen recycle, SCFB | 18,000 | 18,000 |
| Average Catalyst Bed Temp. (for 100% conv.), °F. | 726 | 773 |
| Days on oil | 24 | 40 |
| Yields, wt% of feed | | |
| $H_2$ | −6.4 | −5.3 |
| $H_2S+NH_3$ | 1.0 | 1.0 |
| $C_1$ | 0.0 | 0.1 |
| $C_2$ | 0.4 | 1.1 |
| $C_3$ | 4.6 | 7.1 |
| i-$C_4$ | 8.8 | 10.5 |
| n-$C_4$ | 6.2 | 7.8 |
| i-$C_5$ | 10.8 | 13.5 |
| n-$C_5$ | 2.2 | 1.5 |
| Light Naphtha ($C_6$–180°F.) | 16.7 | 18.3 |
| Heavy Naphtha (180°F.–360°F.) | 55.7 | 44.3 |
| Heavy Naphtha Hydrocarbon Type, | | |
| Paraffins | 33.2 | 26.5 |
| Naphthenes | 42.0 | 34.0 |
| Aromatics | 24.8 | 39.6 |

The second of the three catalyst systems studied in this example comprised a hydrodenitrogenation catalyst, Catalyst G, and a hydrocracking catalyst, Catalyst D. Catalyst G was obtained from the American Cyanamid Company. This catalyst, having Cyanamid's identification HDS-3A, was a commercial desulfurization catalyst. Its typical analysis was as follows: 3.0–4.0 weight percent NiO; 14.5–16.0 weight percent $MoO_3$; 0.04 weight percent sodium (maximum); 0.05 weight percent iron (maximum) a maximum volatile of 2.0 weight percent; and an apparent bulk density of 38–43 pounds per cubic foot. The catalyst support was alumina. Catalyst G was obtained as 1/16-inch extrudates. Catalyst G was loaded into the first two reactors of the multi-reactor pilot plant unit, each reactor having charged thereto 151 grams of the catalyst.

Catalyst D, the hydrocracking catalyst of this system, was described in Example II hereinabove. Catalyst D was loaded into the last three reactors of the multi-reactor pilot plant unit, each reactor receiving 131.7 grams of the catalyst.

After the catalysts had been charged to their respective reactors, the catalyst in the feed-preparation zone was pre-treated. The catalyst beds were heated to 350°–400°F. by circulating nitrogen therethrough at 500 psig. The unit was depressured, filled with hydrogen to 1,000 psig, and hydrogen circulation started. Immediately thereafter, a solution of 59 cc of carbon disulfide in 500 cc of benzene was added to the recycle gas stream at a rate of 30 cc per hour and was continued for 4 hours. During the first three hours, the temperature was held at about 400°F.; however, during the last hour, the catalyst was gradually raised to about 500°F. The carbon disulfide reacts with the hydrogen to form hydrogen sulfide in the first few inches of the catalyst bed. The hydrogen sulfide subsequently reacts rapidly and quantitatively with the metal oxides on the catalyst to form metal sulfides and water. In this manner, all the hydrogen sulfide is removed from the circulating hydrogen stream so that downstream of the point at which the reaction is taking place hydrogen is available to reduce the catalyst without converting it to the sulfided form. A fully sulfided Catalyst G will contain about 5 weight percent sulfur. The length of the pretreatment period and the carbon-disulfide-solution concentration were chosen so that this amount of sulfur, based on the weight of the catlyst in the first two beds would be introduced into the system. The last three reactors in the system, i.e., the hydrocracking reactors, were maintained at a temperature of about 600°F. during this pretreatment of Catalyst G.

After the above pretreatment had been completed, Feedstock No. 3 was introduced into the unit and the carbon disulfide solution was stopped. Within an hour the LHSV was about 0.75 cc of hydrocarbon per hour per cc of catalyst and the temperature in reactors 1 and 2 was about 500°F. Within the next half hour, the LHSV had been increased to 1.0 cc of hydrocarbon per hour per cc of catalyst. Conversion was maintained at a low level overnight, and the following day the temperatures in the reactors were raised to approach 100 percent conversion. Recycle oil was started and this operation was continued over the weekend. On Monday, Feedstock No. 3 was stopped and Feedstock No. 2 was introduced into the unit. After several hot spots had occurred in the hydrocracking reactors, temperatures were adjusted to maintain 100 percent conversion. Results from the 12th day on oil are presented in Table III.

After 19.8 days on oil, Feedstock No. 2 was stopped and Feedstock No. 1 was introduced into the unit. The temperatures were subsequently adjusted to furnish 100 percent conversion of this feedstock. The recycle gas rate was adjusted to provide 18,000 SCFB. Results obtained from the 40th day on oil are presented in Table IV.

The third catalyst system to be tested in the multi-reactor pilot plant unit comprised five reactors of the commercially prepared Catalyst D, which has been described in Example II hereinabove. Each of the five reactors was loaded with 137.1 grams of Catalyst D. This catalyst contained 2.52 weight percent CoO and 9.46 weight percent $MoO_3$ on a support of 35 weight percent ultrastable, large-pore crystalline aluminosilicate material suspended in a low-alumina, silica-alumina matrix.

After the reactors were charged with the catalyst, the reactors were purged with nitrogen and subsequently pressured to 1,300 psig with hydrogen. Hydrogen circulation was established at a rate of 48.5 SCFHP. The catalyst was heated to a temperature of about 720°F. over a period of 8 hours and maintained at that temperature in circulating hydrogen for a period of 16 hours. Then the catalyst was cooled to a temperature of about 520°F. to about 540°F. and Feedstock No. 4, a LVGO, was introduced into the unit at a rate of about 400 cc per hour and increased to a rate of 1,000 cc per hour over a period of about 3 hours. About 4 hours later, recycle oil was started to the unit and the recycle rate was adjusted to a level of about 300 cc per hour. The reactor temperatures were adjusted to give a conversion within the range of about 80 percent to 100 percent to material boiling below 360° F. After 50 hours on oil, Feedstock No. 4 was stopped and Feedstock No. 2 was introduced into the system. Temperatures were adjusted to obtain 100 percent conversion of the fresh feed to material boiling below about 360°F. Results obtained from the 11th day on oil are presented for this Catalyst D in Table III.

Examination of the results in Table III reveals that the preferred embodiment of the process of the present invention, i.e., wherein Catalyst E and Catalyst F are being employed, provides a greater yield of heavy naphtha. Furthermore, the results suggest that a greater percentage of the heavy naphtha material comprises naphthenes. This indicates that the process of this invention produces an increased amount of saturated products, which are desirable constituents of jet fuel.

Examination of the results in Table IV reveals a much larger amount of heavy naphtha for the preferred embodiment of the process of this invention and a surprisingly greater amount of naphthenes in this heavy naphtha material than those produced by the other catalyst system. Again, the preferred embodiment of the process of this invention provides an improved saturated product.

The results of this example indicate that the process of the present invention out-performs a typical one-stage, two-catalyst hydrocracking system and a typical single-stage, one-catalyst hydrocracking system. It provides a more active catalyst system, larger amounts of heavy naphtha, and larger amounts of saturates.

What is claimed is:

1. A process for hydrocracking a petroleum hydrocarbon feedstock which boils above about 350°F. and which contains nitrogen in an amount within the range of about 1 ppm to about 3,000 ppm, which process comprises contacting in a feed-preparation zone said feedstock in the presence of hydrogen and under hydrodenitrogenation conditions with a hydrodenitrogenation catalyst to obtain a denitrogenated effluent, and contacting at least a portion of said denitrogenated effluent in a hydrocracking zone in the presence of hydrogen and under hydrocracking conditions with a hydrocracking catalyst to obtain a hydrocracked effluent, said hydrodenitrogenation catalyst comprising as a hydrogenation component a member selected from the group consisting of (1) a metal from Group VIA of the Periodic Table of Elements and a metal from Group VIII of the Periodic Table of Elements, (2) their oxides, (3) their sulfides, and (4) mixtures thereof and a co-catalytic acidic support comprising an ultrastable, large-pore crystalline aluminosilicate material and a refractory inorganic oxide, and said hydrocracking catalyst comprising as a hydrogenation component a member selected from the group consisting of (1) a metal from Group VIA of the Periodic Table of Elements and a metal from Group VIII of the Periodic Table of Elements, (2) their oxides, (3) their sulfides, and mixtures thereof and an acidic support of an ultrastable, large-pore crystalline aluminosilicate material.

2. The process of claim 1 wherein said metal of Group VIA of said hydrocracking catalyst is tungsten and said metal of Group VIII of said hydrocracking catalyst is nickel.

3. The process of claim 1 wherein said process is a single-stage process.

4. The process of claim 1 wherein said metal of Group VIA of said hydrodenitrogenation catalyst is tungsten, said metal of Group VIII of said hydrodenitrogenation catalyst is nickel, and said refractory inorganic oxide is silica-alumina.

5. The process of claim 4 wherein said metal of Group VIA of said hydrocracking catalyst is tungsten and said metal of Group VIII of said hydrocracking catalyst is nickel.

6. The process of claim 4 wherein said ultrastable, large-pore crystalline aluminosilicate material of said hydrodenitrogenation catalyst is suspended in a porous matrix of said silica-alumina.

7. The process of claim 6 wherein said metal of Group VIA of said hydrocracking catalyst is tungsten and said metal of Group VIII of said hydrocracking catalyst is nickel.

8. The process of claim 7 wherein said process is a single-stage process.

9. The process of claim 4 wherein said ultrastable, large-pore crystalline aluminosilicate material of said hydrodenitrogenation catalyst is characterized by a maximum cubic unit cell dimension of 24.55 Angstrom units, hydroxyl infrared bands near 3700 cm$^{-1}$ and near 3625 cm$^{-1}$ and an allkali metal content of less than 1 weight percent.

10. The process of claim 9 wherein said metal of Group VIA of said hydrocracking catalyst is tungsten and said metal of Group VIII of said hydrocracking catalyst is nickel.

11. The process of claim 10 wherein said ultrastable, large-pore crystalline aluminosilicate material of said hydrodenitrogenation catalyst is suspended in a porous matrix of said silica-alumina.

12. The process of claim 11 wherein said process is a single-stage process.

13. The process of claim 9 wherein said ultrastable, large-pore crystalline aluminosilicate material of said hydrodenitrogenation catalyst is suspended in a porous matrix of said silica-alumina.

14. The process of claim 13 wherein said metal of Group VIA of said hydrocracking catalyst is tungsten and said metal of Group VIII of said hydrocracking catalyst is nickel.

15. The process of claim 14 wherein said ultrastable, large-pore crystalline aluminosilicate material of said hydrocracking catalyst is characterized by a maximum cubic unit cell dimension of 24.55 Angstrom units, hydroxyl infrared bands near 3700 cm$^{-1}$ and near 3625 cm$^{-1}$, and an alkali metal content of less than 1 weight percent.

16. The process of claim 15 wherein said ultrastable, large-pore crystalline aluminosilicate material of said hydrodenitrogenation catalyst is present in an amount within the range of about 5 weight percent to about 70 weight percent, based upon the weight of said support of said hydrodenitrogenation catalyst.

17. The process of claim 16 wherein said nickel and said tungsten of said hydrocracking catalyst are present in a total amount within the range of about 0.03 to about 0.20 gram-mole of NiO and WO$_3$ per 100 grams of catalyst and in a tungsten-to-nickel ratio within the range of about 0.6 to about 12.0.

18. The process of claim 16 wherein said nickel and said tungsten of said hydrodenitrogenation catalyst are present in a total amount within the range of about 0.03 to about 0.20 gram-mole of NiO and WO$_3$ per 100 grams of catalyst and in a tungsten-to-nickel ratio within the range of about 0.6 to about 12.0.

19. The process of claim 18 wherein said nickel and said tungsten of said hydrocracking catalyst are present in a total amount within the range of about 0.03 to about 0.20 gram-mole of NiO and WO$_3$ per 100 grams of catalyst and in a tungsten-to-nickel ratio within the range of about 0.6 to about 12.0.

20. The process of claim 19 wherein said hydrodenitrogenation conditions comprise a hydrogen-to-oil ratio within the range of about 5,000 SCFB to about 40,000 SCFB, a total pressure within the range of about 500 psig to about 5,000 psig, an average catalyst bed temperature within the range of about 400° to about 800°F., and a LHSV within the range of about 0.1 to about 20 volumes of hydrocarbon per hour per volume of catalyst, and said hydrocracking conditions comprise a hydrogen-to-oil ratio within the range of about 5,000 SCFB to about 20,000 SCFB, a total pressure within the range of about 700 psig to about 4,000 psig, an average catalyst bed temperature within the range of about 650° to about 850°F., and a LHSV within the range of about 0.1 to about 10 volumes of hydrocarbon per hour per volume of catalyst.

21. The process of claim 20 wherein said process is a single-stage process.

* * * * *

UNITED STATES PATENT OFFICE
CERTIFICATE OF CORRECTION

Patent No. 3,923,638         Dated December 2, 1975

Inventor(s) Ralph J. Bertolacini, Louis C. Gutberlet, and Allen A. Kozinski

It is certified that error appears in the above-identified patent and that said Letters Patent are hereby corrected as shown below:

Column 8, line 28, "Faujasties" should be -- Faujasites --.

Column 8, line 63, "in tungsten-to-" should be -- in a tungsten-to- --.

Column 10, line 10, "catalyst" should be -- catalytic --.

Column 11, line 16, "on the test" should be -- on test --.

Column 13, line 27, "naphthalene" should be -- naphthene --.

Column 14, line 44, "selectively" should be -- selectivity --.

Column 14, lines 64-65, "demonstrated" should be -- demonstrate --.

Column 18, line 67, "beds would" should be -- beds, would --.

Column 20, line 38, "and mixtures" should be -- and (4) mixtures --.

Column 21, line 3, "allkali" should be -- alkali --.

Signed and Sealed this

Twenty-first Day of October 1980

[SEAL]

Attest:

SIDNEY A. DIAMOND

Attesting Officer    Commissioner of Patents and Trademarks